United States Patent [19]

Ridenour

[11] Patent Number: 4,795,499

[45] Date of Patent: Jan. 3, 1989

[54] DUCT MOUNT SENSOR ASSEMBLY

[76] Inventor: Ralph G. Ridenour, 626 Lexington-Ontario Rd., Mansfield, Ohio 44903

[21] Appl. No.: 174,157

[22] Filed: Mar. 28, 1988

[51] Int. Cl.[4] ............................................. H01L 35/02
[52] U.S. Cl. ................................... 136/230; 136/232; 248/71
[58] Field of Search .................. 136/230, 232; 248/71

[56] References Cited

U.S. PATENT DOCUMENTS

| | | | |
|---|---|---|---|
| 1,869,151 | 5/1926 | Jeffery et al. | 136/230 X |
| 2,326,217 | 8/1943 | Hart | 297/3 |
| 2,504,764 | 4/1950 | Vollrath | 136/4 |
| 2,992,402 | 7/1961 | Thomas | 339/198 |
| 3,011,004 | 11/1961 | Meador | 136/4 |
| 3,085,125 | 4/1963 | Hill | 136/4 |
| 3,159,032 | 12/1964 | Rademacher et al. | 73/359 |
| 4,060,094 | 11/1977 | McAinsh | 136/230 |
| 4,412,090 | 10/1983 | Kawate et al. | 136/230 |
| 4,436,504 | 3/1984 | Kommm | 136/230 X |
| 4,491,680 | 1/1985 | Manecke | 136/230 X |
| 4,491,860 | 1/1984 | Manecke | 136/230 |
| 4,558,959 | 12/1985 | Thomas et al. | 136/230 X |
| 4,603,228 | 7/1986 | Kamada | 136/230 X |

Primary Examiner—Peter A. Nelson
Attorney, Agent, or Firm—Pearne, Gordon, McCoy & Granger

[57] ABSTRACT

A duct mount sensor assembly includes a condition sensor such as a temperature sensor mounted in the distal end of a sensor tube and the proximal end thereof is secured to a mounting plate. A cover on the opposite surface of the mounting plate covers any electrical connections to conductor wires from the sensor. Threaded fasteners such as sheet metal screws secure the cover and the mounting plate and also secure both to a duct wall. The foregoing abstract is merely a resume of one general application, is not a complete discussion of all principles of operation or applications, and is not to be construed as a limitation on the scope of the claimed subject matter.

15 Claims, 1 Drawing Sheet

DUCT MOUNT SENSOR ASSEMBLY

BACKGROUND OF THE INVENTION

A number of temperature sensing devices have been proposed for example in U.S. Pat. No. 1,869,151 a pyrometer tube was suggested with a protective tube over the temperature sensor and a hinged cover over the terminals. U.S. Pat. No. 2,504,764 suggested a thermocouple inside a tube and with a cover screwed to a flange on the shielding tube. U.S. Pat. No. 3,011,004 discloses a thermocouple design with a thermocouple inside a protective tube and a cover over the terminals held on by a central threaded stud. U.S. Pat. No. 4,060,094 suggests a construction for a high temperature thermocouple inside a protective tube, and U.S. Pat. No. 4,412,090 suggests an alternative construction. U.S. Pat. No. 4,491,680 suggests a mounting of a temperature sensing probe by a single screw on the wall of cooking apparatus.

These patents do not suggest a construction for a temperature sensing probe wherein the electrical connections are properly covered for protection yet wherein the protective cover may be readily removed and the entire mount may be readily removed for servicing or replacement.

SUMMARY OF THE INVENTION

Accordingly the problem to be solved is how to construct a duct mount sensor assembly wherein a simple and readily removable cover and mount are secured to a duct wall. This problem is solved by a duct mount sensor assembly comprising in combination a mounting plate having first and second surfaces and a central opening, a duct sensor tube having a proximal end secured to said mounting plate at said central opening and extending from said first surface, a condition sensor in a distal end of said duct sensor tube, conductors extending from said sensor through said tube and central opening to a position beyond said second surface of said mounting plate, said mounting plate first surface adapted to be secured to a duct wall with said sensor tube extending through an opening in the duct wall to sense a condition within the duct, a readily removable cover on said second surface of said mounting plate to receive any external conductor connections to said sensor conductors, and first and second threaded fasteners each securing said cover and said mounting plate together and each adapted to secure both to a duct wall.

A feature of the invention is to provide a duct mount sensor assembly wherein only two screws are used for mounting both the protective cover and the mounting plate one to the other and both to the duct wall.

Other objects and a fuller understanding of the invention may be had by referring to the following description and claims, taken in conjunction with the accompanying drawing.

DESCRIPTION OF THE PREFERRED EMBODIMENT

Figure 1:
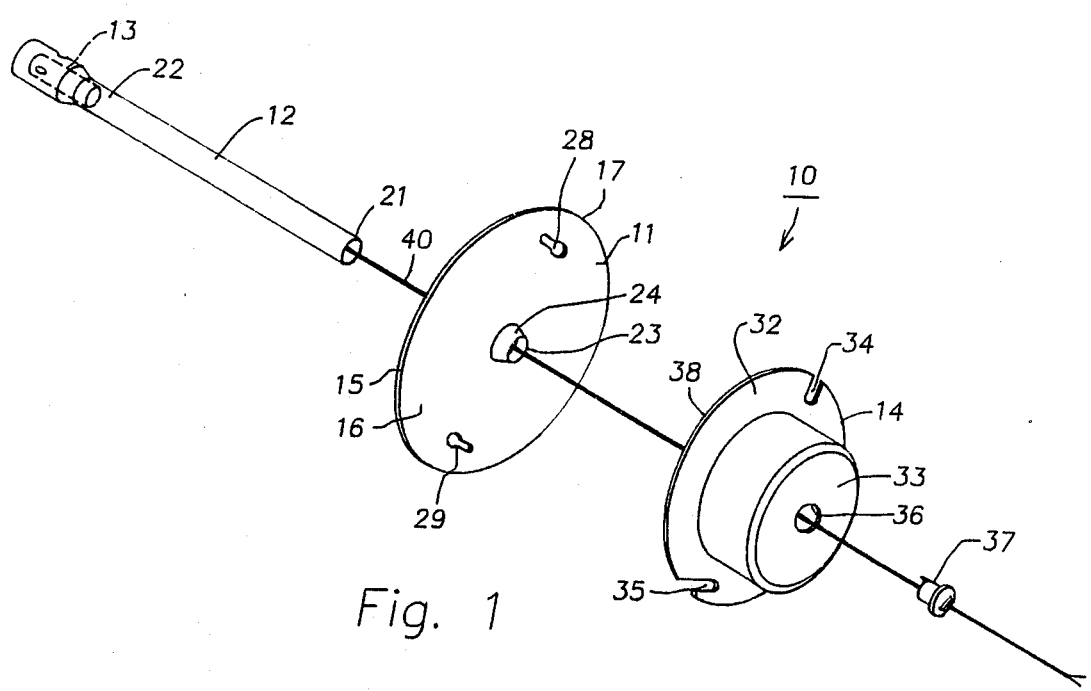
FIG. 1 is an exploded isometric view of a duct mount sensor assembly incorporating the invention.

The drawing figures show a duct mount sensor assembly 10 which includes generally a mounting plate 11, a duct sensor tube 12, a condition sensor 13, and a cover 14. The mounting plate 11 has first and second surfaces 15 and 16, respectively, and has an outer periphery 17 shown as circular about an axis 18.

The duct sensor tube 12 has a proximal end 21 and a distal end 22. The condition sensor 13 may be a temperature sensor such as a thermocouple and it is mounted in the distal end 22. The proximal end 21 is secured to the mounting plate 11 at a central opening 23. This central opening is formed by a pierced flange 24 and this proximal end 21 is secured such as by staking to this flange such that the first surface 15 of the mounting plate 11 is smooth and planar right up to the edge of the duct sensor tube 12. By this means the first surface 15 of the mounting plate may be mounted on a smooth wall of a duct 26 which has an opening 27 to receive the sensor tube 12. Since the first surface 15 is a smooth planar surface it will permit a flush mounting against the duct wall 26 without any leakage of air or other gas from the interior to the exterior of the duct without necessity for any gasket or packing. The mounting plate 17 has first and second apertures 28 and 29 which may be termed mounting apertures.

Figure 2:
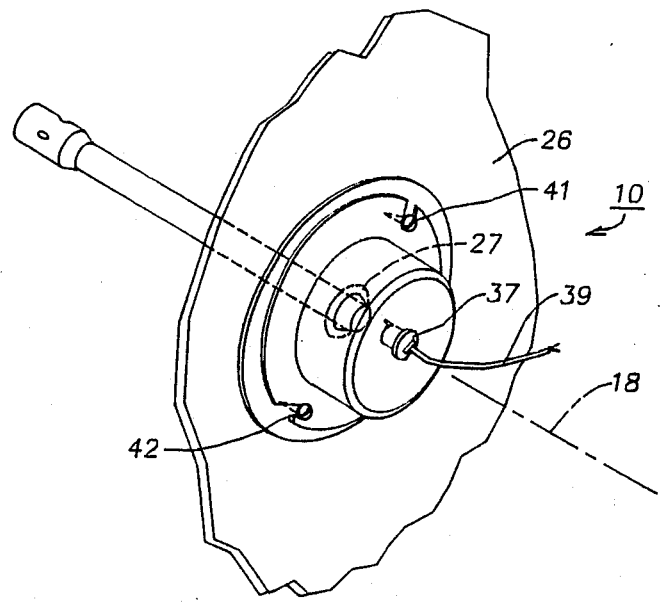
FIG. 2 is an isometric view of the assembly mounted on a duct wall.

The cover 14 may be made from sheet metal such as sheet steel similar to the material of the mounting plate 11 and sensor tube 12. The cover 14 has a flange 32 and a central cap portion 33. When assembled as shown in FIG. 2 the central cap portion 33 provides an enclosed space with the mounting plate 11 for covering any terminals or connections. The flange 32 has first and second apertures 34 and 35, respectively, which may be referred to as mounting apertures. The central cap portion 33 has a coaxial aperture 36 which receives a conductor strain relief 37. An exterior conductor cable 39 may pass through this strain relief 37 to the space between the cover 14 and mounting plate 11. Underneath this cover there may be mounting terminals or merely connectors such as twist-on pressure connectors to conductors 40 leading through the sensor tube 12 to the condition sensor 13. First and second threaded fasteners shown as sheet metal screws 41 and 42 each secure the cover 14 and the mounting plate 11 together and each is adapted to secure both to the duct wall 26.

The first and second apertures in the mounting plate 11 have a shape different from the shape of the apertures in the cover 14 and as a result different movements are established for the removal of each of the cover 14 and mounting plate 11. The apertures 28 and 29 and the mounting plate 11 are keyhole shape apertures with the long axis thereof tangent to a concentric circle about the axis 18. Each has the enlarged end of the keyhole aperture in the clockwise direction relative to the narrow or slot end thereof so that upon loosening the screws 41 and 42, the mounting plate 11 need be rotated only slightly counterclockwise about the axis 18 to permit removal of the mounting plate in an axial direction. The apertures 34 and 35 and the cover 14 are shown as slots extending in from the periphery 38 of the cover flange 32. The first aperture 34 is substantially a radially slot and the second aperture 35 is substantially a tangential slot about the first screw 41 as a pivot. Thus in order to remove the cover 14 the screws 41 and 42 do not have to be removed but merely loosened, with the cover pivoted slightly counter clockwise about the first screw 41 and then moved generally in translation downwardly that is, slot 34 is moved toward the axis 18, and then the cover 14 may be removed axially. In this manner the cover 14 is readily removable and then one may remove the entire mounting plate and sensor tube by a small counterclockwise movement about the axis 18.

The sensor tube 12 passes through the opening 27 in the duct wall 26 and this opening need not be enlarged for two reasons; the first being that the smooth staking on the first surface 15 permits this first surface of the mounting plate 11 to closely engage the duct wall 26; and the second reason is that the installation and removal of the mounting plate 11 from the duct wall is accomplished by a small rotation about the axis 18 and then an axial movement without any necessity for movement of the entire mounting plate laterally of the aperture 27.

It will be noted that the threaded fasteners or screws 41 and 42 are disposed substantially diametrically opposite each other at the mounting plate 11. The fact that the apertures in the cover 14 are of a different shape from the shape of the apertures in the mounting plate 11 establishes that the cover 14 is readily removable without concomitant removal of the mounting plate 11. The mounting of the mounting plate and cover 14 is the opposite of the removal with only slight tightening of the screws required. The duct mount sensor assembly is therefor one which is readily mounted on a duct wall and the tube 12 may be of any desired length so that the sensor 13 is away from the duct wall to better monitor the air or gas condition within the duct.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A duct mount sensor assembly comprising in combination:
    a mounting plate having first and second surfaces and a central opening;
    a duct sensor tube having a proximal end secured to said mounting plate at said central opening and extending from said first surface;
    a condition sensor in a distal end of said duct sensor tube;
    conductors extending from said sensor through said tube and central opening to a position beyond said second surface of said mounting plate;
    said mounting plate first surface adapted to be secured to a duct wall with said sensor tube extending through an opening in the duct wall to sense a condition within the duct;
    a readily removable cover on said second surface of said mounting plate to receive any external conductor connections to said sensor conductors; and
    first and second threaded fasteners each securing said cover and said mounting plate together and each adapted to secure both to a duct wall.

2. A duct mount sensor assembly as set forth in claim 1, wherein said threaded fasteners are disposed substantially diametrically opposite each other at said mounting plate.

3. A duct mount sensor assembly as set forth in claim 1, wherein said threaded fasteners are sheet metal screws for mounting said assembly to a sheet metal duct.

4. A duct mount sensor assembly as set forth in claim 1, including apertures in each of said cover and said mounting plate to receive said threaded fasteners.

5. A duct mount sensor assembly as set forth in claim 1, including said apertures in said cover being of a shape different from the shape of the apertures in said mounting plate for permitting easy removal of said cover without concomitant removal of said mounting plate.

6. A duct mount sensor assembly as set forth in claim 5, wherein the apertures in one of said cover and mounting plate are keyhole apertures.

7. A duct mount sensor assembly as set forth in claim 6, wherein the apertures in the other of said cover and mounting plate are slots extending inwardly from the periphery thereof.

8. A duct mount sensor assembly as set forth in claim 7, wherein the main axis of each of said keyhole apertures is in a direction different from the direction of the respective slot.

9. A duct mount sensor assembly as set forth in claim 1, wherein said threaded fasteners are headed screws; and
    including apertures in each of said cover and said mounting plate to receive said headed screws.

10. A duct mount sensor assembly as set forth in claim 9, including said apertures having a shape to establish removal of each of said cover and said mounting plate with only loosening and not removal of said screws from said duct wall.

11. A duct mount sensor assembly as set forth in claim 10, wherein said apertures have a shape such that said cover and said mounting plate are removable by different motions of each.

12. A duct mount sensor assembly as set forth in claim 1, including the duct sensor tube proximal end being staked to said mounting plate by means of a stake projecting on said second surface of said mounting plate and not on said first surface of said mounting plate.

13. A duct mount sensor assembly as set forth in claim 1, including each of said mounting plate and cover having a shape establishing removal of said cover by a motion different from the motion established for removal of said mounting plate.

14. A duct mount sensor assembly as set forth in claim 4, wherein said apertures in said mounting plate are keyhole apertures with the main axis tangential to a concentric circle about said axis to establish a rotary motion about said axis for removal of said mounting plate.

15. A duct mount sensor assembly as set forth in claim 14 wherein said apertures in said cover are slots extending inward from the periphery of said cover to establish a pivotal movement about one of said slots for removal of said cover.

* * * * *